US007349870B1

(12) United States Patent
Mahoney et al.

(10) Patent No.: US 7,349,870 B1
(45) Date of Patent: Mar. 25, 2008

(54) METHOD FOR THE RESALE OF VEHICLES

(75) Inventors: Andrew Mahoney, Fort Lauderdale, FL (US); Jay Hinchman, Highland Beach, FL (US)

(73) Assignee: Word Omni Financial Corporation, Deerfield Beach, FL (US)

( * ) Notice: Subject to any disclaimer, the term of this patent is extended or adjusted under 35 U.S.C. 154(b) by 288 days.

(21) Appl. No.: 10/602,896

(22) Filed: Jun. 24, 2003

(51) Int. Cl.
*G06Q 30/00* (2006.01)
*G06F 17/30* (2006.01)

(52) U.S. Cl. .......................................... 705/26; 705/27

(58) Field of Classification Search ............ 705/26-27, 705/1
See application file for complete search history.

(56) References Cited

U.S. PATENT DOCUMENTS

| | | | | |
|---|---|---|---|---|
| 6,006,201 | A * | 12/1999 | Berent et al. | 705/27 |
| 2002/0133416 | A1* | 9/2002 | Abhyanker | 705/26 |
| 2003/0036964 | A1* | 2/2003 | Boyden et al. | 705/26 |
| 2003/0083949 | A1* | 5/2003 | Kar | 705/26 |
| 2003/0130966 | A1* | 7/2003 | Thompson et al. | 705/500 |
| 2005/0015308 | A1* | 1/2005 | Grove et al. | 705/26 |

FOREIGN PATENT DOCUMENTS

JP 02001236448 A * 8/2001

OTHER PUBLICATIONS

"Auto dealership revs up high-end effort," Schoettle, Anthony, Indianapolis Business Journal, vol. 21, No. 44, p. 7A, Jan. 8, 2001.*
"Prattville, Ala., Car Consignment Business Takes Off," Deidra M. Lemons, Knight Ridder Tribune Business News, Washington, Mar. 14, 2003.*

* cited by examiner

*Primary Examiner*—Matthew S. Gart
(74) *Attorney, Agent, or Firm*—Edwards Angell Palmer & Dodge LLP; Howard M. Gitten

(57) ABSTRACT

A method and apparatus for the resale of vehicles includes a server communicating over the Internet to a dealer computer and an auction computer. The server stores data corresponding to a schedule of auctions for resale of vehicles. The server provides access to itself by the dealer computer by way of a web site and allows the dealer to access the server to consign a vehicle to the auction. The server notifies the auction computer of the vehicle consigned to the auction at the web site. The server receives information about the vehicle from the dealer computer and determines an adjusted floor value for the vehicle and transmits the adjusted floor value to the auction computer.

17 Claims, 7 Drawing Sheets

*FIG. 10*

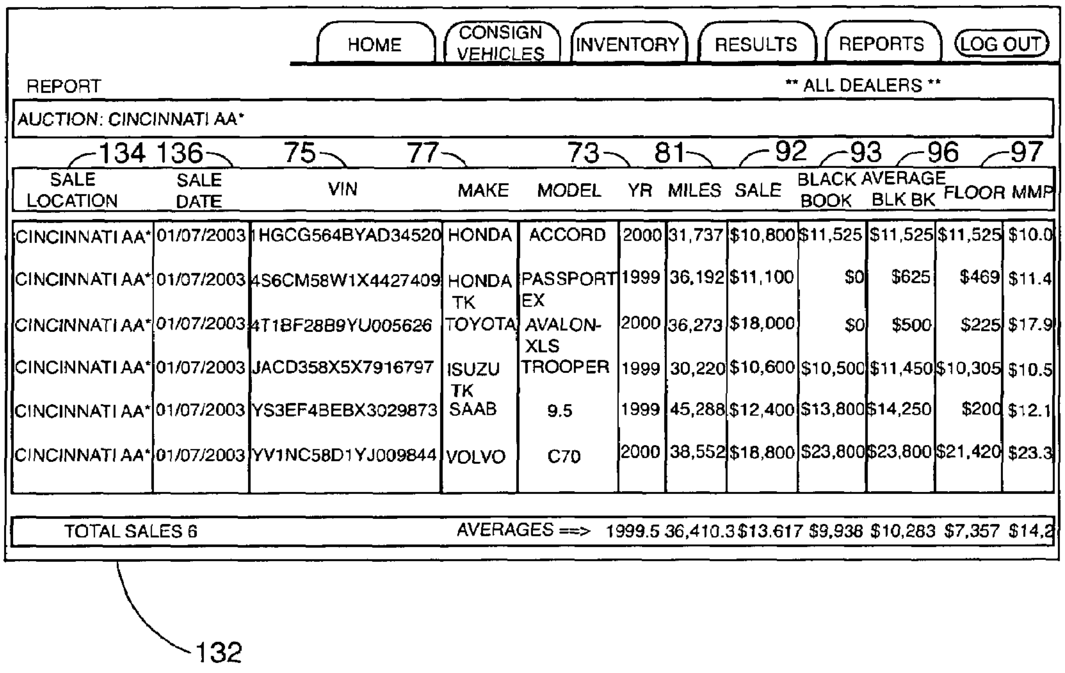

| SALE LOCATION | SALE DATE | VIN | MAKE | MODEL | YR | MILES | SALE | BLACK BOOK | AVERAGE BLK BK | FLOOR | MMP |
|---|---|---|---|---|---|---|---|---|---|---|---|
| CINCINNATI AA* | 01/07/2003 | 1HGCG564BYAD34520 | HONDA | ACCORD | 2000 | 31,737 | $10,800 | $11,525 | $11,525 | $11,525 | $10.0 |
| CINCINNATI AA* | 01/07/2003 | 4S6CM58W1X4427409 | HONDA TK | PASSPORT EX | 1999 | 36,192 | $11,100 | $0 | $625 | $469 | $11.4 |
| CINCINNATI AA* | 01/07/2003 | 4T1BF28B9YU005626 | TOYOTA | AVALON-XLS | 2000 | 36,273 | $18,000 | $0 | $500 | $225 | $17.9 |
| CINCINNATI AA* | 01/07/2003 | JACD358X5X7916797 | ISUZU TK | TROOPER | 1999 | 30,220 | $10,600 | $10,500 | $11,450 | $10,305 | $10.5 |
| CINCINNATI AA* | 01/07/2003 | YS3EF4BEBX3029873 | SAAB | 9.5 | 1999 | 45,288 | $12,400 | $13,800 | $14,250 | $200 | $12.1 |
| CINCINNATI AA* | 01/07/2003 | YV1NC58D1YJ009844 | VOLVO | C70 | 2000 | 38,552 | $18,800 | $23,800 | $23,800 | $21,420 | $23.3 |
| TOTAL SALES 6 | | | AVERAGES ==> | | 1999.5 | 36,410.3 | $13.617 | $9,938 | $10,283 | $7,357 | $14,2 |

METHOD FOR THE RESALE OF VEHICLES

BACKGROUND OF THE INVENTION

1. Field of Invention

This application is directed to a method for the resale of vehicles by dealers or financial institutions at auction and, in particular, a method for providing dealers greater control of the auction process.

2. Background

Many vehicles, such as automobiles, trucks, sports utility vehicles are returned to the dealer or financial institution (collectively, dealer) after substantial use, either as a result of a vehicle coming "off lease" at the end of a leasing agreement, or by way of "trade-in" as partial payment for a new car. This results in vehicle dealers accumulating more vehicles than they are able to resell at their dealerships. Because dealerships have limited space for the display of both new and used cars, it is desirable for dealers to reduce this inventory of used cars as quickly and efficiently as possible. To accomplish this dealers make use of used car auctions run by third parties.

During the prior art auction process, the dealer would send information about the vehicle, including an estimated sale value, as determined by the dealer, by facsimile or orally over the phone to the auction representative. The auction representative would then enter all the information from the dealer, by hand, into their inventory database for an upcoming auction. This process lends itself to inputting errors.

The auctioneer then segregates the cars to be auctioned into two groups known as the "dealer lane" and "fleet lane". The dealer lane is made of those cars consigned for auction by dealers and are generally smaller lots of cars, while the fleet lane is comprised of cars that come from sources, such as leasing companies, rental car companies, or other agencies, which sell cars in greater aggregate numbers per lot than dealers. The fleet lane, because of its greater size and perceived car quality, is auctioned at those auction times known to bring best value for the vehicle. An entry code is required to qualify a vehicle for the fleet lane so that dealers cannot consign their cars for auction in the fleet lane.

Although this process has been satisfactory, it suffers from the shortcoming that the manner in which the car is valued is subjective as the value is based more on the perceived demand for the car as determined by the dealer, any business relationships between the dealer and the auctioneer which may limit the number of auctions available to the dealer, and misinformation regarding the value of the car at the outset. Furthermore, it places dealers at a disadvantage to fleet cars because of their limited size of inventory.

Accordingly, a method and apparatus for auctioning used vehicles, which overcomes the shortcomings of the prior art is desired.

SUMMARY OF THE INVENTION

A method and apparatus for the resale of vehicles includes a server communicating over the Internet to a dealer computer and an auction computer. The server stores data corresponding to a schedule of auctions for resale of vehicles. The server provides access to itself by the dealer computer by way of a web site and allows the dealer to access the server to consign a vehicle to the auction. The server receives information about the vehicle from the dealer computer and determines a floor value for the vehicle. The server notifies the auction computer of the vehicle consigned to the auction at the web site and transmits the floor value and other information to the auction computer.

BRIEF DESCRIPTION OF THE DRAWINGS

In the drawing figures which are not to scale, and which are merely illustrative and wherein like reference numerals depict like elements throughout the several views:

FIG. 10 is a detailed results page constructed in accordance with the invention.

DETAILED DESCRIPTION OF THE PREFERRED EMBODIMENTS

Figure 1:
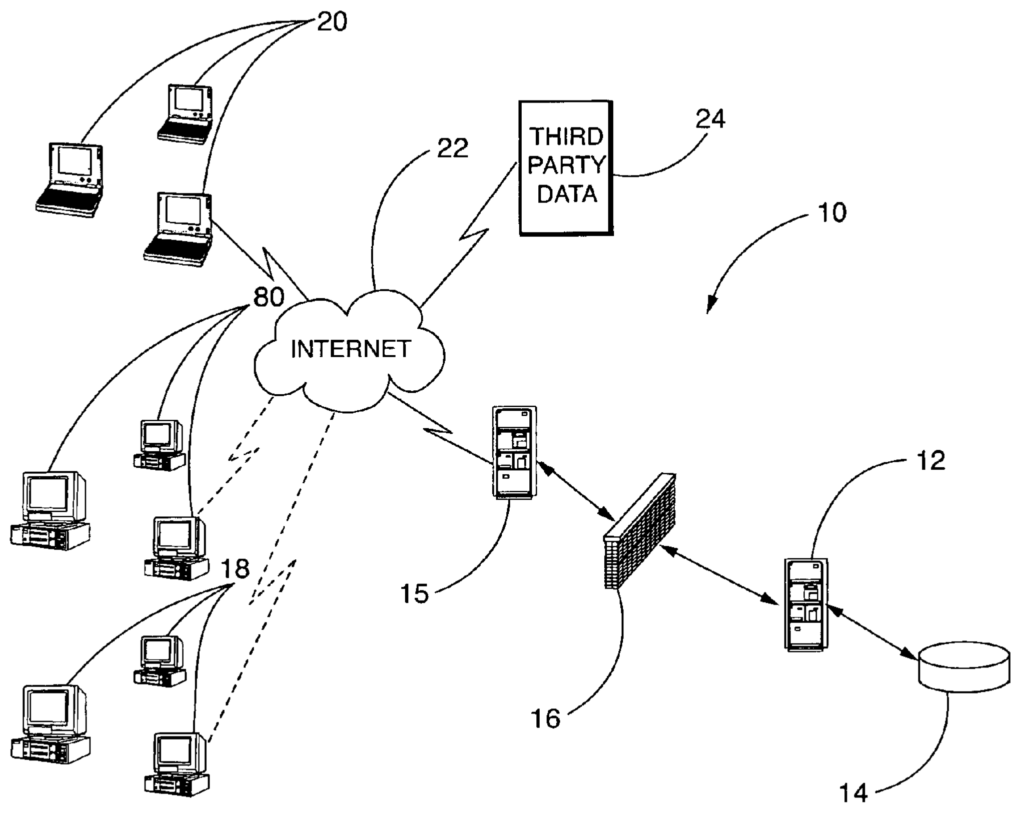
FIG. 1 is a block diagram illustrating an online interconnection of dealers with an auction for online consignment of vehicles to auction in accordance with the invention.

Referring to FIG. 1, an interactive system or computer network 10 for use in carrying out the methodology of the present invention for coordinating the sale of used vehicles by auction is provided. Computer network 10 is established, operated and maintained as known in the art. Although computer network 10 as described utilizes a global computer network, such as the Internet, it is to be understood that the methodology of the present invention could be practiced utilizing other computer or communications networks capable of interactive processing of data and transmittal thereof to distant parties. Furthermore, in the description the term car and vehicle may be used interchangeably; however, the method to be described below can be used for any vehicle, including trucks, boats, motorcycles or the like which are resold at auction and have a value based upon original market value, use, repair history and accessories added.

In the preferred embodiment, computer network 10 is a conventional computer network capable of making use of Internet applications and includes database 14, servers 12, 15 disposed on opposite sides of a firewall 16 which are selectively accessible through Internet 22 by computers 18 (used by dealers) and computers 20 (used by auction representatives); the end users of computer system 10.

As will be realized based upon the discussion below, servers 12, 15 may be placed on the same side of the firewall and servers 12, 15, databases 14 and firewall 16 may be considered as a single system server connected to the Internet and therefore for ease of description shall be collectively referenced as server 12, unless otherwise indicated. The dealer computers 18 and auction representative computers 20 use browsers to connect to server 15 which, in conjunction with server 12 and database 14, responds to requests and commands received from these browsers to generate an interactive auction network web site through which part of the methodology of the present invention may be practiced. Additionally, server 12, through server 15 and Internet 22, accesses third-party database servers 24 which contain data thereon to enable the auction process 95 described below.

Access to the system is provided to dealers and auction representatives (the system users). Computer system 10 provides security measures to prevent unauthorized access as known in the art as by requiring a previously established account with a unique combination of an account number and/or password.

The auction process is a fluid process relying on ever-changing information such as date and time of auction, current value of a vehicle, vehicle inventory at a particular auction and the like. Data such as the time and place of an auction, the current value of a vehicle, are constantly changing with time. By way of example, the schedule for upcoming auctions is continuously being updated in advance of the occurrence of that auction and as auctions are added to or removed from the calendar. Therefore, the schedule of available auctions for auctioning a vehicle is constantly being changed and updated. Furthermore, the value of a vehicle changes with age. The older a car becomes, until it obtains collector or antique status, its value depreciates over time. Therefore, the value of a car continuously changes over time. Data such as auction schedule for a respective auction or data regarding the value of a specific make and model of a vehicle may be provided online by third party database servers 24.

For example, the respective auctioneers in the various geographic regions publish auction schedules on a periodic basis. These schedules are published at third party database server 24 which are available through the Internet such as from Auto IMS. Similarly, there are well known databases for determining car values, such as the "Black Book," "Blue Book" or the like, and others as is known in the art. These values are also available from a third party database server 24 through Internet 22. On a periodic basis, server 12 downloads the current auction schedule and current vehicle value through Internet 22 from third party database servers 24 and stores this downloaded information on its own database 14 to make it available as needed to dealer computers 18 and auction representative computers 20. Database 14 may be updated on a daily, weekly, monthly or any other periodic basis appropriate for maintaining data current enough to satisfy the needs of the dealers and auction representatives. It should be understood that this data may also be input by hand (keyboard), memory device (CD ROM, flash card, or the like) or any other known input method.

Figure 2:
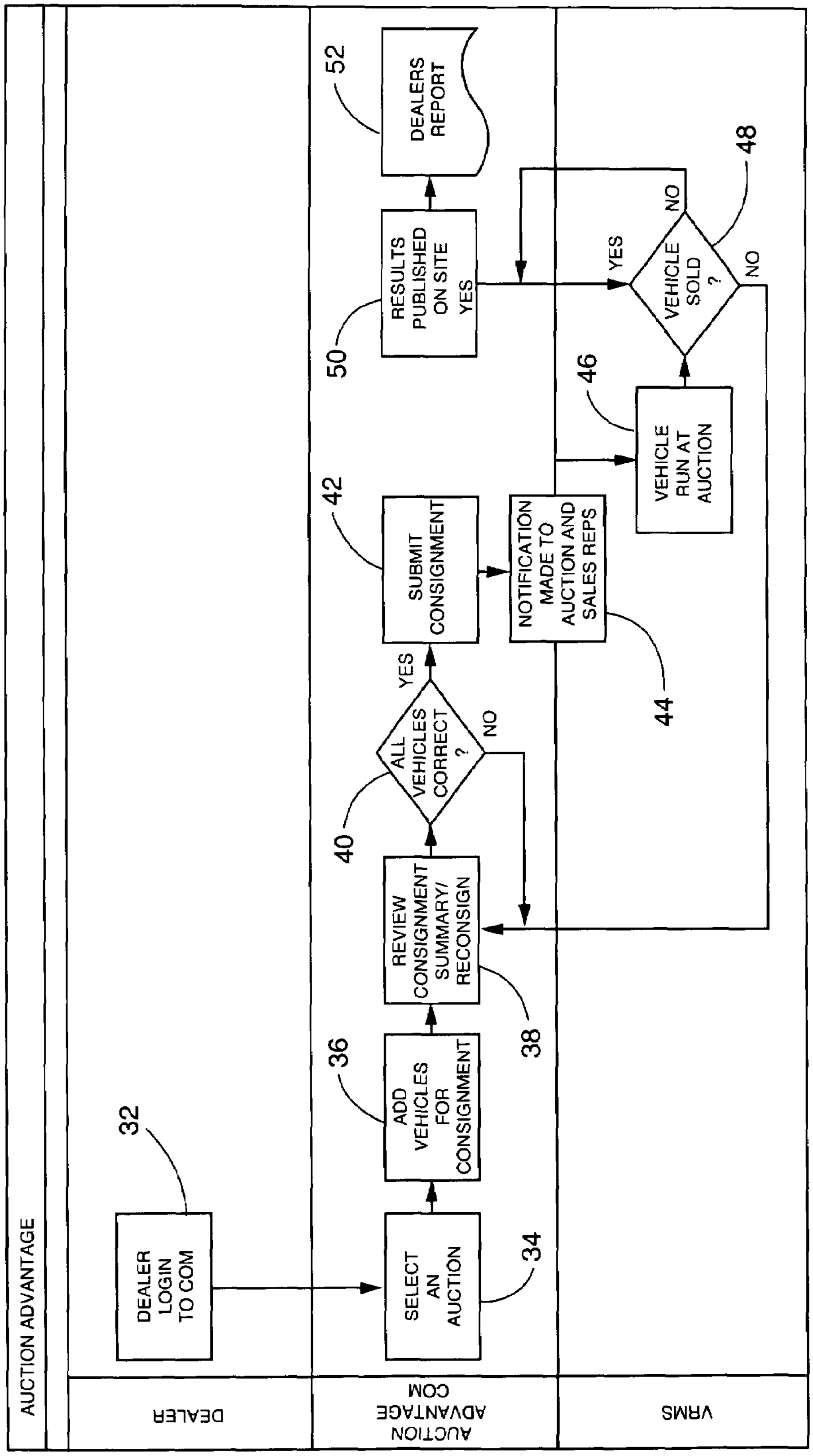
FIG. 2 is a flow diagram illustrating the principal steps in the online auction.

Reference is now made to FIG. 2 in which a flow chart for the method in which a dealer wishing to resell vehicles at auction, utilizing computer system 10 in accordance with the invention is provided. A dealer logs in from remote computer 18 through Internet 22 in accordance with step 32.

Figure 3:
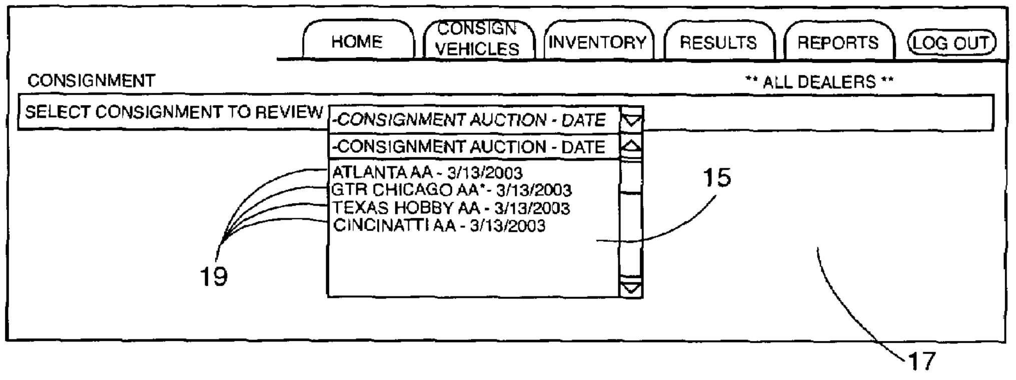
FIG. 3 is an illustration of an auction page in accordance with the invention.

Once on the system, a dealer is presented with an auction web page 17 by server 12 which is populated with data from database 14 concerning consignment auctions which are to be held within the next two-week (or other desired) period as shown in FIG. 3. A drop down menu 15, or other manner for presenting data known in the art utilizing a graphical user interface (GUI) presents auctions 19 and their respective dates. In step 34 the dealer, from computer 18, selects an auction 19 to which the dealer desires to provide vehicles for auction. Selecting the auction temporarily stores the selected auction in database 14.

Figure 5:
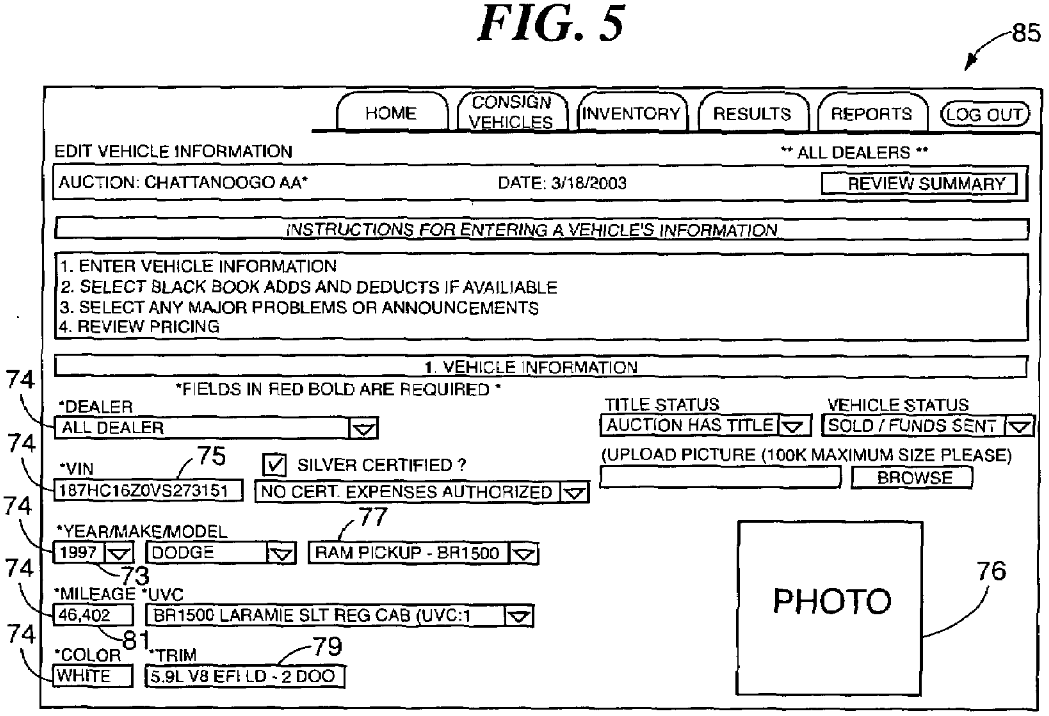
FIG. 5 is an illustration of a vehicle consignment page in accordance with the invention.
Figure 4:
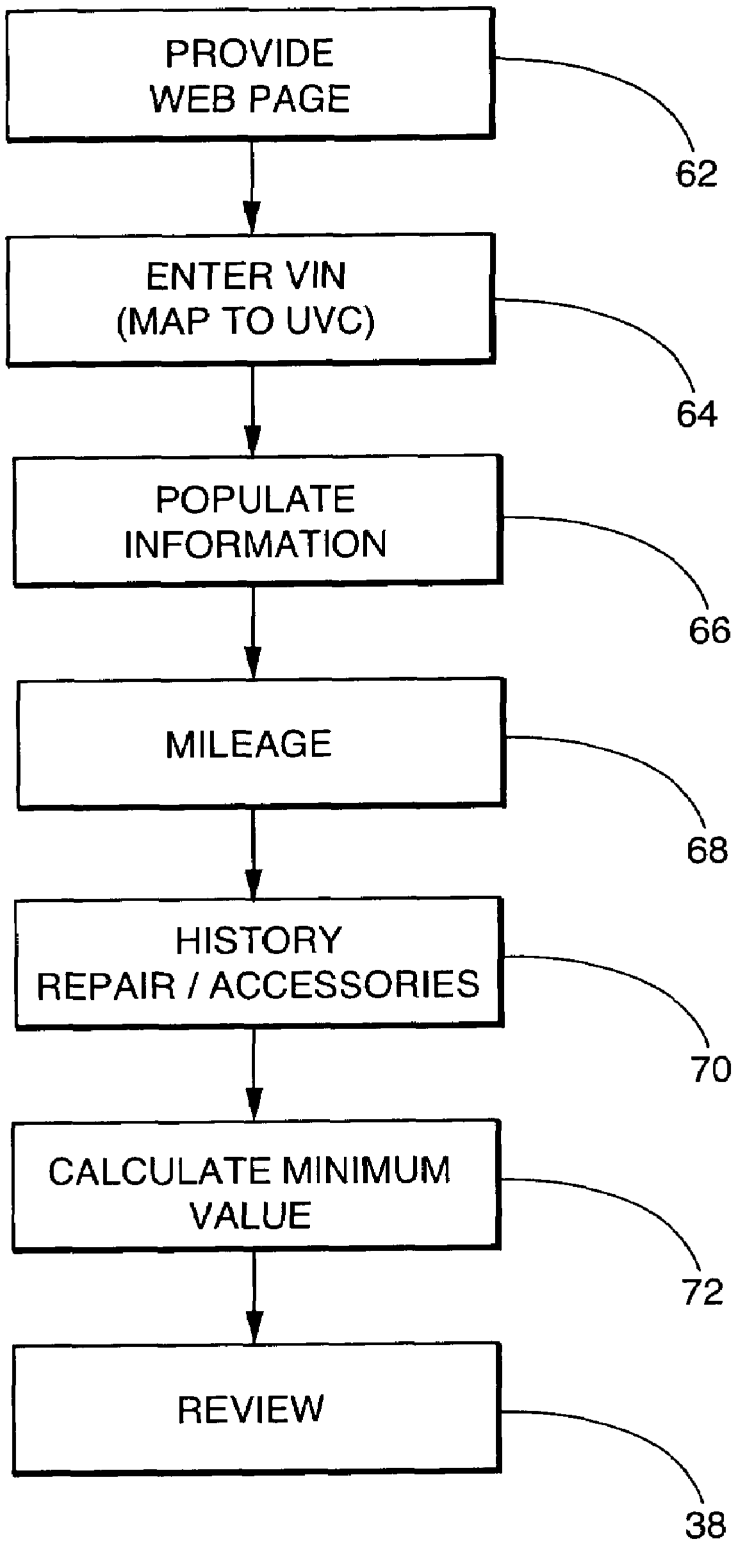
FIG. 4 is a flow diagram of the method for adding vehicles for consignment in accordance with the invention.

In step 36 the dealer will assign vehicles from its inventory to the selected auction. Reference is also made to FIG. 4 in which a flow diagram for selecting vehicles for consignment is provided. In a first step 62, the dealer is provided access to a consignment web page 85 generated by servers 12, accessed by the dealers utilizing conventional browsers on computer 18. The consignment web page 85 (see FIG. 5) includes GUI fields 74 for providing vehicle information regarding the vehicle to be consigned for auction. The dealer from computer 18 populates these fields 74. In a preferred embodiment step 64, the dealer provides the Vehicle Identification Number (VIN) 75. The VIN 75 of the vehicle corresponds to information regarding the vehicle and is maintained in database 14 or may be downloaded from a third party database server 24. Server 12 then communicates with a third party database server 24 to map VIN 75 with a Universal Vehicle Code (UVC) for that vehicle. The VIN and UVC are vehicle-specific. Therefore, given the VIN and UVC as is known in the art, server 12 can determine through data either stored at database 14 or at readily-available third party sources, such as server 24, the year/make/model of the vehicle as well as the accessories with which the vehicle was manufactured. Server 12 then populates the vehicle information, such as year 73, make/model 77, and accessories 79, corresponding to the vehicle as manufactured onto the consignment page 85 in step 66. In the alternative, the dealer, through computer 18, could populate each of fields 74 with information known to the dealer.

The value of a vehicle is also a function of wear and tear on the vehicle and post-manufacture upgrades (status information). It is known in the art to determine wear and tear as a function of mileage and repair history for the vehicle. The dealer will be prompted by server 12, to input mileage 81 into the appropriate field 74 on consignment page 85 in accordance with step 68. In accordance with step 70, the user will be prompted by server 12 to add any post-manufacture accessories 83 to fields 74 (see FIG. 6) on consignment page 85 or value page 87 as well as histories of substantial repairs. Substantial repairs are those sufficiently significant to materially affect the value of the vehicle. Such repairs would be frame damage, repeating transmission problems, replaced engine or frame parts, or the like and entered in field 83. At this time, the dealer may wish to provide a photograph of the vehicle to be uploaded to consignment page 85 at picture field 76.

Figure 6:
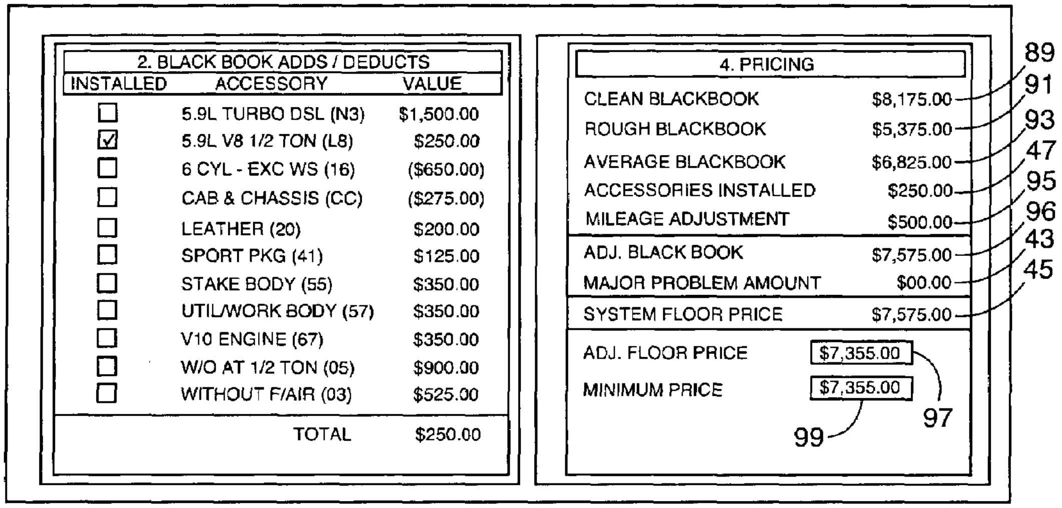
FIG. 6 is an illustration of a vehicle pricing page in accordance with the invention.

In step 72, server 12 calculates a minimum suggested value (the system floor price) 45 for the vehicle and presents the value on a value page 87 (see FIG. 6). In a preferred embodiment, server 12 compares the vehicle and status information input at consignment page 85 to the Black Book value data stored in database 14 to determine a clean Black Book value 89, a rough Black Book value 91 and an average Black Book value 93 which is the average of the two numbers based upon the information provided by the dealer and mapped against clean, rough and average Black Book values stored in database 14. A mileage adjustment 95, above and beyond the Black Book determination, is then made for any excessive mileage by subtracting out a value determined by server 12 by formula or mapping to a database. Conversely, the value can be increased as shown in FIG. 6 if the mileage 81 is determined to be excessively low. Another adjustment may be made for any accessories added in field 83. The sum of the average Black Book value 93, accessories installed 47 and mileage adjustment 95 is the adjusted Black Book value 96.

If any major repair problem has arisen, server 12 assigns a major problem amount to it. This is added to the adjusted Black Book value and is provided as the default adjusted floor price 97 to the dealer at computer 18 by server 12 over Internet 22. The dealer may edit the provided adjusted floor price 97 which will be used as the opening bid at auction. A default minimum price 99 is set at the adjusted floor price 97, but it too may be edited by the dealer as it will be the minimum price the dealer will accept for the vehicle if the opening bid is too high.

It should be noted that Black Book data is utilized by way of example. However, any other third party source such as blue book data for valuing vehicles, which is either available through third party servers 24 or downloadable to database 14, may also be used to determine an adjusted value. Furthermore, a formula stored in database 14 to be performed by server 12 may also be used to determine the adjusted floor value based upon data stored in database 14 and/or the vehicle and status information input from computers 18 of the dealer. What is required is that a consistent objective methodology be used throughout the system.

Once a floor value has been set, in a step 38 the dealer may review the vehicle and status information, review the floor value and enter its own floor value as minimum price 99 if it believes that adjusted floor price 97 is inappropriate. Steps 32-38, including steps 62-72 may be repeated for each new vehicle to be provided on consignment.

Figure 7:
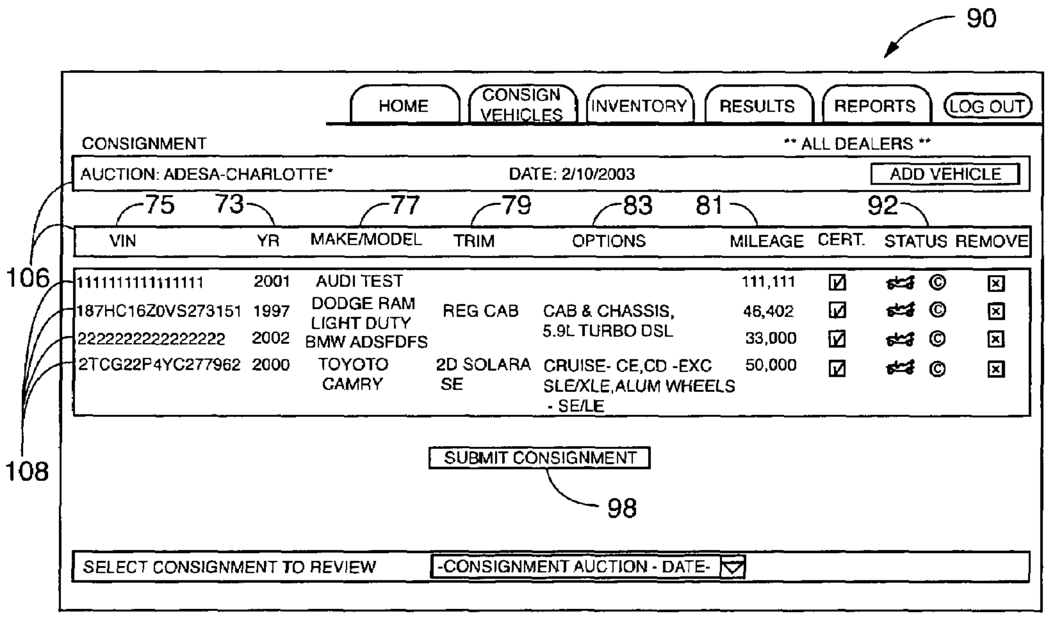
FIG. 7 is an illustration of a consignment inventory page in accordance with the invention.
Figure 8:
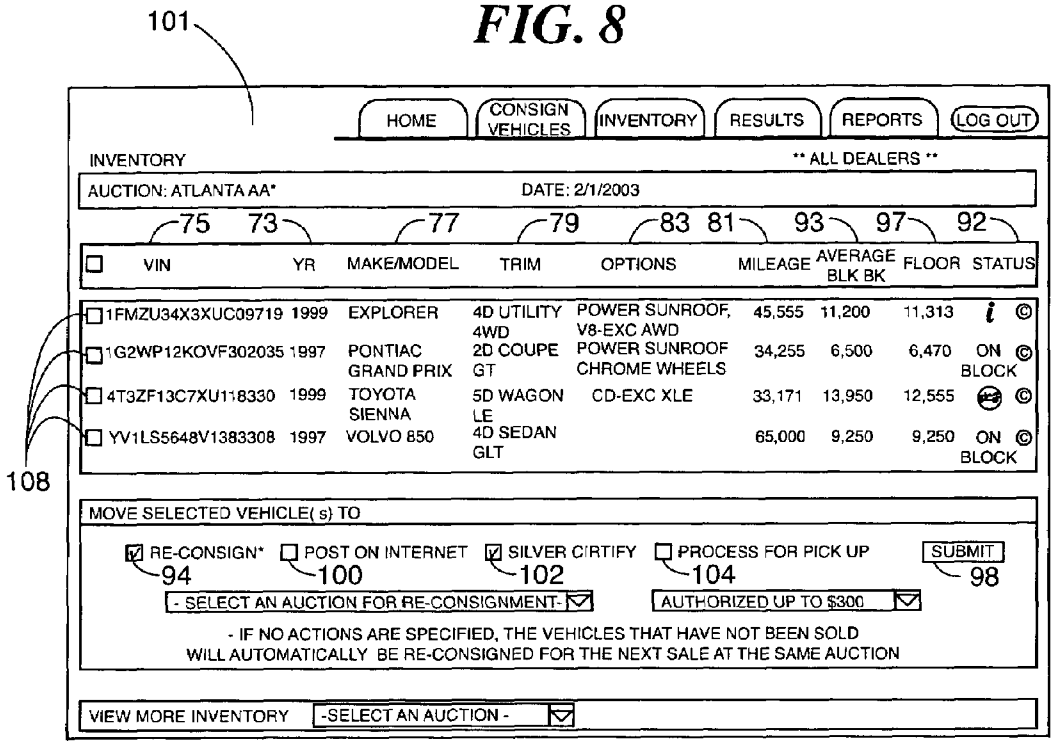
FIG. 8 is an illustration of an auction inventory page in accordance with the invention.

As each vehicle is consigned to an auction, the vehicle information and various prices are stored in database 14 and mapped to the previously stored auction data. A consignment inventory page 90 (FIG. 7) is created by server 12 and made accessible to the dealer. Consignment inventory page 90 includes an auction field 106 in which all vehicles 108 consigned to that selected auction are presented along with floor price information and other vehicle and status information as desired from consignment page 85.

In step 40, the dealer may pull up a consignment inventory page 90 (FIG. 7) which includes a field 106 of a selected auction with its date. Field 106 is populated with selected vehicles 108 which have been selected for consignment to the auction. Vehicle 108 is identified by way of non-limiting example with vehicle information such as its Vehicle Identifier Number 75, year 73, make and model 77, accessories 79, options 83, mileage 81 and status 92 for each vehicle which has been proposed to be consigned for the auction. As with all inventory and report pages, sufficient information is provided for the user to determine whether the vehicle has been properly priced to be successfully sold.

If the vehicle information for the consigned vehicle is correct, then the dealer would select a "submit consignment" icon 98 in accordance with step 42. If the information is not correct as determined in step 40, the process is returned to step 38 by selecting a vehicle 108 from field 106 which returns the process to step 62 and consignment page 85 for further review although not all of steps 62-72 need be repeated. Alternatively, desired vehicles 108 may be deleted from field 106.

Once the vehicles are submitted for consignment sale at auction in step 42, the vehicle information, associated dealer information (account number, address and the like) and associated auction (place and time, and the like) are stored in database 14. Furthermore, this information is then forwarded across Internet 22 to the appropriate auction representative to be displayed and stored at the auction representative computer 20. In a preferred embodiment, the information sent to an auction representative does not have an associated dealer. This way, all of the consigned vehicles originating from server 12 can be aggregated and treated as a fleet, entitling dealers to the benefits of the high volume transactions in the "fleet lane". Furthermore, in a preferred embodiment, upon submission of consignment in step 42, server 12 outputs the VIN for the vehicle, the dealer address, and the auction date and address over the Internet as an e-mail notification to computer 80 of a vehicle transporter to arrange for the transport of the vehicles from the dealer to the auction in a timely manner.

By receiving the information directly on their computers 20, the auction representatives can automatically update the consignment inventory for a particular auction. This removes any inputting errors.

The dealers, through their use of computers 18, can also access an auction inventory page 101 through Internet 22 provided by server 12. The inventory page 101 displays the current inventory of the dealer's unsold vehicles for a selected auction and date. Like consignment inventory page 90, it has an auction field 106 with vehicles 108 presented therein with identifying information. This field also includes a status field 92 which indicates whether the vehicle is "on the block," as reported to server 12 by the auction representatives. The dealer may review the vehicles consigned to the auction and the status of the vehicle with respect to the auction. At this point in time, if the vehicle is not sold at auction, the process will automatically transfer the information to the next auction at that location at which the vehicle is in inventory, unless the dealer requests other action by modifying the record in the application. On the other hand, the dealer may reconsign a particular vehicle to another auction by selecting the vehicle from the inventory list 108 from inventory page 101 and select a "Reconsign" icon 94. An alternative auction is selected from a drop-down field 96 which is populated from the auction sites stored in database 14. Once an alternative auction has been selected, the information is submitted to server 12 which in turn notifies the alternative auction in accordance with the same process used to notify the original auction in step 44.

Alternatively, the dealer may desire to post an automobile for sale on the Internet. Again, the dealer would highlight the desired vehicle from field 106, select the "Post on Internet" icon 100, select the submit button and the information regarding the vehicle from consignment page 20 will be made available by server 12 at a web site accessible to the general public.

Lastly, highlighting a vehicle 108 and the vehicle may be certified which confirms that the vehicle has met certain criteria as determined from the vehicle and change in status information or processed for pick-up by selecting one of icons 102, 104 respectively. If pick-up is selected, then upon submission the dealer is prompted to input an address to be utilized by server 12 to notify the transportation provider at computer 80. The selection for reconsignment or processed pick-up will notify the auction representative computer 20 and remove the consigned vehicle from the auction inventory.

Those vehicles remaining for consignment will be auctioned, preferably in the fleet lane in accordance with known vehicle auction practices. Reference is again made to FIG. 2 to continue the description of the process. The auction representatives receive the vehicle information at their computers 20 in accordance with step 44. The vehicle including its vehicle information, minimum price and adjusted price in step 44. Upon entry of the information, the auction representatives through computers 20 will notify server 12 that the status of the vehicle is that it is "on the block." The status is stored in database 14 and used to populate field 92 of screen 101. It should be noted that at this time a dealer through their computer 18 can edit any of the vehicles 108 in field 106 to either change the vehicle information, change its status, or even the floor price. This change in information is sent to server 12, which makes note of the change of information, stores the changed information in database 14 and forwards the changed information to the auction representatives at their computers 20. It should also be noted that the auction representatives report their status information to third party database 24 such as Auto IMS so that server 12 may periodically download any change in status without reliance upon the auction representatives.

The vehicles then run at auction in accordance with the step 46. The result of the auction is stored at computer 20 and transmitted through Internet 22 to third party database 24 and/or to server 12 for storage in their respective databases. The auction representatives will transmit the high bid and selling price of the vehicle to third party database server 24 and/or server 12.

If it is determined in a step 48 that the vehicle was not sold based upon the report, then the dealer will review the consignment inventory in a step 38, as discussed above, to determine whether or not to remove or reconsign the vehicle for auction and repeat steps 38-42.

Server 12 utilizes the vehicle information and the results information as received from the auction representatives to create a results page 110 in a step 50. The results page 50 includes an auction field 122, which allows the dealer to select an auction of concern from a drop down menu. When selected, an auction field 122, having each of the dealer's consigned vehicles listed therein, is provided. Each vehicle 108 in auction field 122 may be identified as in other pages by vehicle identifier 75, the year 73, make and model 77, trim description 79, and mileage 81 by way of non-limiting example. However, results page 110 also includes the auction results, such as the status 92 (sold vs. unsold), the selling price 124, the high bid 126 if different than the selling price, as well as the average Black Book 93 and adjusted floor price 97. The selling price 124 and status 92 as well as high bid 126 are culled from information from database 14, either obtained directly from auction representative computers 20 or third party database 24.

Figure 9:
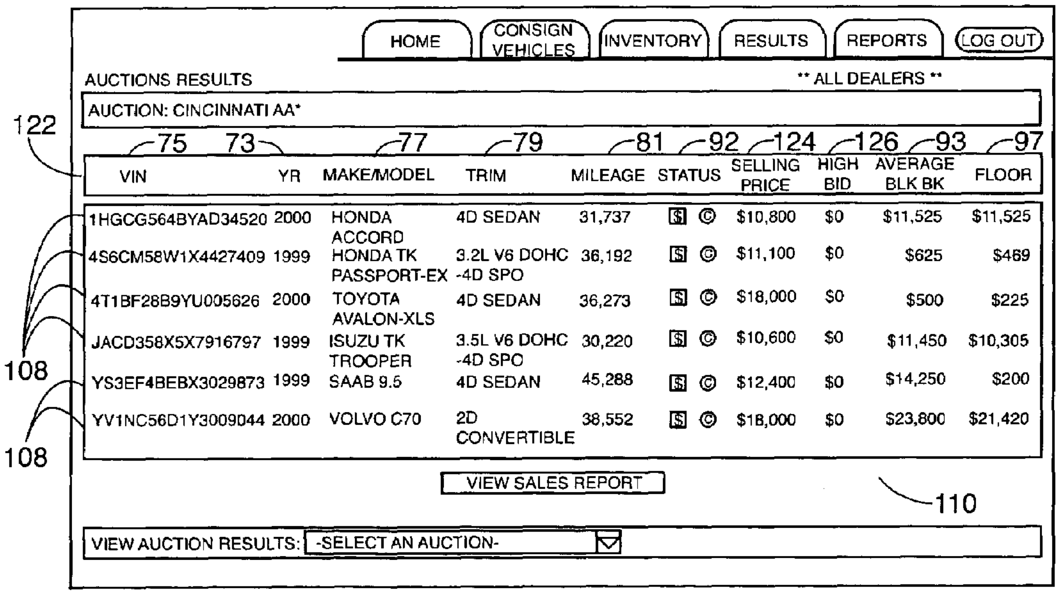
FIG. 9 is an auction results page constructed in accordance with the invention.

Reference is now made to FIG. 9. In a step 52, dealers may access dealer-specific reports regarding the vehicles consigned for auction by the dealer at a report results page 130. Report results page 130 will have an auction history field 132 which identifies report results by sale location 134, sale data 136, vehicle identifier 75, make and model 77, sale price 92, year 73, mileage 81 and other relevant information by was of non-limiting example such as the Black Book determined price 93, the adjusted Black Book price 96, the floor price 97. In this way, data may be reviewed on an annual basis, quarterly basis or any other periodic basis to provide the dealer with information to determine the success of individual auctions. Additionally, server 12 generates sales information such as total sales from a particular auction, as well as the averages for a year, mileage, sales prices, Black Book and adjusted Black Book. This allows the user to audit the success of certain auctions, certain pricing strategies, and certain vehicles.

It should be noted that the above description was based upon the resale of a car or truck utilizing a Black Book value criteria as the subjective price determinater. However, any vehicle such as boats, airplanes, motorcycles, recreational vehicles or the like which have a value, which changes with time, as a function of use, repair history and mileage/hours may be sold, utilizing this method and apparatus. Furthermore, the initial users of the device were identified as vehicle or car dealers. However, it is foreseeable that the above method can be applied by an auction service provider on an individual basis in order to aggregate vehicles to be sold at auction on consignment in order to provide users as granulated as individuals having only one car the benefits of auctioning as a fleet owner. Although dealers were used as one end user, any person or entity with a right to sell a vehicle may in fact be a user of the system from a user computer 18.

Thus, while there have been shown, described and pointed out novel features of the present invention as applied to preferred embodiments thereof, it will be understood that various omissions and substitutions and changes in the form of details of the disclosed invention may be made by those skilled in the art without departing from the spirit and scope of the invention. It is the intention, therefore, to be limited only as indicated by the scope of the claims appended hereto. It is also to be understood that the following claims are intended to cover all of the generic and specific features of the invention herein described and all statements of the scope of the invention, which as a matter of language might be said to fall therebetween. In particular, this invention should not be construed as being limited to the use of specific Internet structures, specific screens or web pages, specific prompts or a specific valuation method as disclosed herein.

What is claimed is:

1. A method for the resale of vehicles comprising the steps of:

downloading auction data for a plurality of auctions from a third party database;

storing said downloaded auction data in a system server, said auction data corresponding to a schedule of auctions for resale of vehicles;

providing access to said system server by way of a web site;

allowing a user to access said system server to consign a vehicle to one of said plurality of auctions;

inputting vehicle information about said vehicle into said system server;

said system server determining an adjusted floor price for said vehicle based upon said vehicle information;

consigning said vehicle by said system server by transmitting said adjusted floor price to said one of said plurality of auctions; and notifying said one of said plurality of auctions of said vehicle consigned and said adjusted price to said one auction at said web site.

2. The method of claim 1, wherein said vehicle information includes a vehicle identifier corresponding to the vehicle to be consigned and further comprising the steps of:

said system server utilizing said vehicle identifier to gather vehicle information regarding said vehicle at time of manufacture to determine a minimum value;

said system server prompting said user to add status information corresponding to changes in status of said vehicle since manufacture of said vehicle;

said system server calculating an adjusted floor price for said vehicle at auction based upon said vehicle information and said change in status information; and forwarding said adjusted floor price to said one of said plurality of auctions when submitting consignment of said vehicle.

3. The method of claim 2, wherein said vehicle identifier is a Vehicle Identification Number.

4. The method of claim 3, further comprising the step of mapping said Vehicle Identification Number to a Universal Vehicle Code to obtain the vehicle information.

5. The method of claim 2, wherein said status information includes a vehicle mileage.

6. The method of claim 2, wherein said status information includes a repair history of the vehicle.

7. The method of claim 2, wherein said status information includes upgrade information corresponding to accessories added to the vehicle since manufacture.

8. The method of claim 1, further comprising the step of notifying a transportation facility for transporting said consigned vehicle to a selected auction in response to receipt of the submission of consignment of the vehicle at the web site.

9. The method of claim 1, further comprising the step of auctioning the vehicle.

10. The method of claim 8, further comprising the step of said auction providing an auction result to said system server and said system server storing said auction result and providing access to said auction result by displaying a results report at said web site.

11. The method of claim 2, wherein said system server calculates said minimum value utilizing black book data.

12. The method of claim 11, wherein said black book data is obtained by said system server from a third party data source.

13. The method of claim 11, wherein said auction data is periodically updated.

14. The method of claim 11, wherein said black book data is periodically updated.

15. The method of claim 10, wherein said results includes the price at which the consigned vehicle was sold.

16. The method of claim 8, further comprising the step of providing access to a dealer report at said web site.

17. The method of claim 15, further comprising the step of producing a dealer result report wherein said dealer result report provides vehicle information and auction results for each vehicle consigned by said dealer.

* * * * *